United States Patent [19]

Somerville

[11] Patent Number: 4,992,650
[45] Date of Patent: Feb. 12, 1991

[54] METHOD AND APPARATUS FOR BARCODE RECOGNITION IN A DIGITAL IMAGE

[75] Inventor: Peter J. Somerville, Bethesda, Md.

[73] Assignee: International Business Machines Corporation, Armonk, N.Y.

[21] Appl. No.: 500,980

[22] Filed: Mar. 29, 1990

[51] Int. Cl.$^5$ .............................................. G06K 7/10
[52] U.S. Cl. ..................................... 235/462; 235/463
[58] Field of Search ............... 235/462, 470, 463, 472

[56] References Cited

U.S. PATENT DOCUMENTS

| | | | |
|---|---|---|---|
| 4,125,765 | 11/1978 | Cowardin et al. | 235/463 |
| 4,160,901 | 7/1979 | Nakanishi et al. | 235/462 |
| 4,667,089 | 5/1987 | Shirakabe et al. | 235/462 |
| 4,748,316 | 5/1988 | Dickson | 235/454 |
| 4,776,024 | 10/1988 | Katoh et al. | 382/9 |
| 4,873,426 | 10/1989 | Sarna et al. | 235/462 |

Primary Examiner—Stuart S. Levy
Assistant Examiner—Kenton R. Mullins
Attorney, Agent, or Firm—John E. Hoel

[57] ABSTRACT

A recognition method and apparatus is disclosed which provides information on what type of barcode is to be recognized and the strategy to be applied in identifying and decoding the barcode. For N raster lines of a dimension "x", an array of one byte sums of dimension "x" is created. The sums are the sum of the "1" bits in the rectangular binary image input array in the N lines of the image. A new array can be generated which will have a dimension equal to the number of changes from black to white in the original "x-y" digital image. The values in this array will represent the length of each run of same color pels. These runs are then normalized according to rules of a particular barcode standard being handled.

7 Claims, 8 Drawing Sheets

```
Sum - 0001111100...05550000000550055555551144444344 11550055
         └──┘       └┘└─────┘└┘└┘└─────┘ └┘└─────┘   └┘└┘└┘└┘
Run      30   5  65    3  7  3 2   8    2    8      2 2 2 2
length   └──┴─┴──┘  .. └──┴──┴─┴───┴────┴────┴──────┴─┴─┴─┴─┘
         ^         ^                    │
         ^too wide          Σ    39 sum of 10 elements
                          /    ↓  div 16 (number of units)
                                 3    = pels/unit (rounded up)

Thresholds for narrow/wide - 3/5
                                          └┘
             0 1 0 0 1 0  0 1 0 0 0    ←───┘
             └───────────┬──────────┘
                         ↓
                      x'0128'
                         ↓         Lookup in barcode table
                         *         Decoded result character
```

↑ Scan 'rows' ↓

← Scan 'Columns' →

FIG. 4
Table of decoding constraints used to illustrate method:-
```
Minimum characters in barcode     = 4
Minimum pels in element unit      = 1
Maximum pels in element unit      = 6
Maximum pels in a run within code = 24
Elements per barcode (incl gap)   = 10
Unit elements per character       = 16
Number of lines to sum (1,2)      = 6,10
Number of lines to skip           = 10
```
FIG. 5
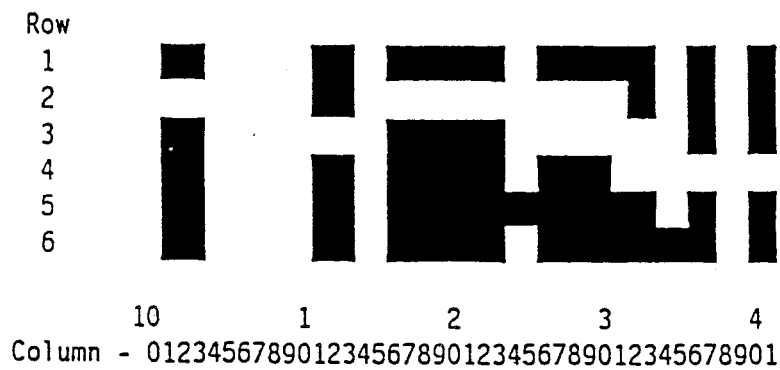
```
Row
 1
 2
 3
 4
 5
 6
         10        1         2         3         4
Column - 01234567890123456789012345678901234567 8901
```
FIG. 6
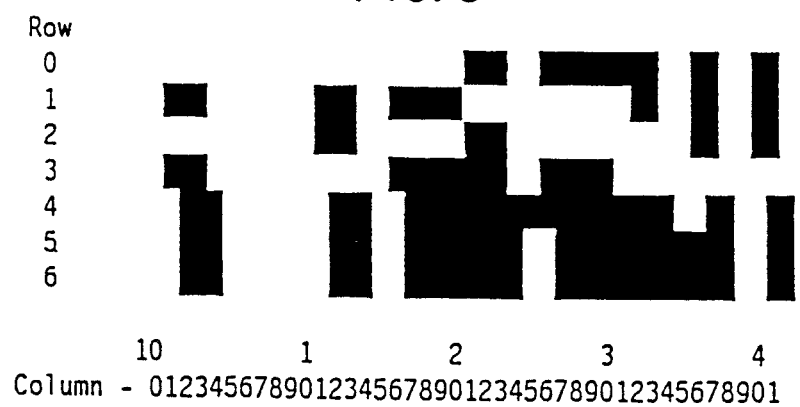
```
Row
 0
 1
 2
 3
 4
 5
 6
         10        1         2         3         4
Column - 0123456789012345678901234567890123456789 01
```

This table of numbers is the result of partially decompressing
row -10 to 'run ends'

115 120 160 164 200 204 240 244 280 284

10 run ends found

FIG. 7

This table of numbers is the result of partially decompressing
row 1 to 'run ends'

```
 29  34 100 103 110 113 115 123 125 133 135 137 139 142 144
152 154 157 164 172 174 177 179 182 185 193 195 197 204 207
209 217 219 227 229 237 239 242 244 247 256 259 262 270 273
275 283 185 191 >200
                  ^
        50 run ends found (^ = run end #40)
```

This table of numbers is the result of partially decompressing
rows 1 to 6 as far as column 140.

| Row | |
|---|---|
| 1 | 29 34 100 103 110 113 115 123 125 133 135 137 139 |
| 2 | 110 113 115 130 133 135 137 139 |
| 3 | 100 103 115 123 135 137 139 |
| 4 | 100 103 110 113 115 123 125 130 |
| 5 | 100 103 110 113 133 135 137 139 |
| 6 | 100 103 110 113 115 123 125 137 139 |

FIG. 8

```
Column -    3    ..    10         11         12         13        14
         ...901234......1234567890123456789012345678901

Sum  -  ..0001111000...05550000005555555511444443441155000055

Black if sum >= 6/2 (3); White if sum < 6/2 (3)

Adjusted 'image' :-
```

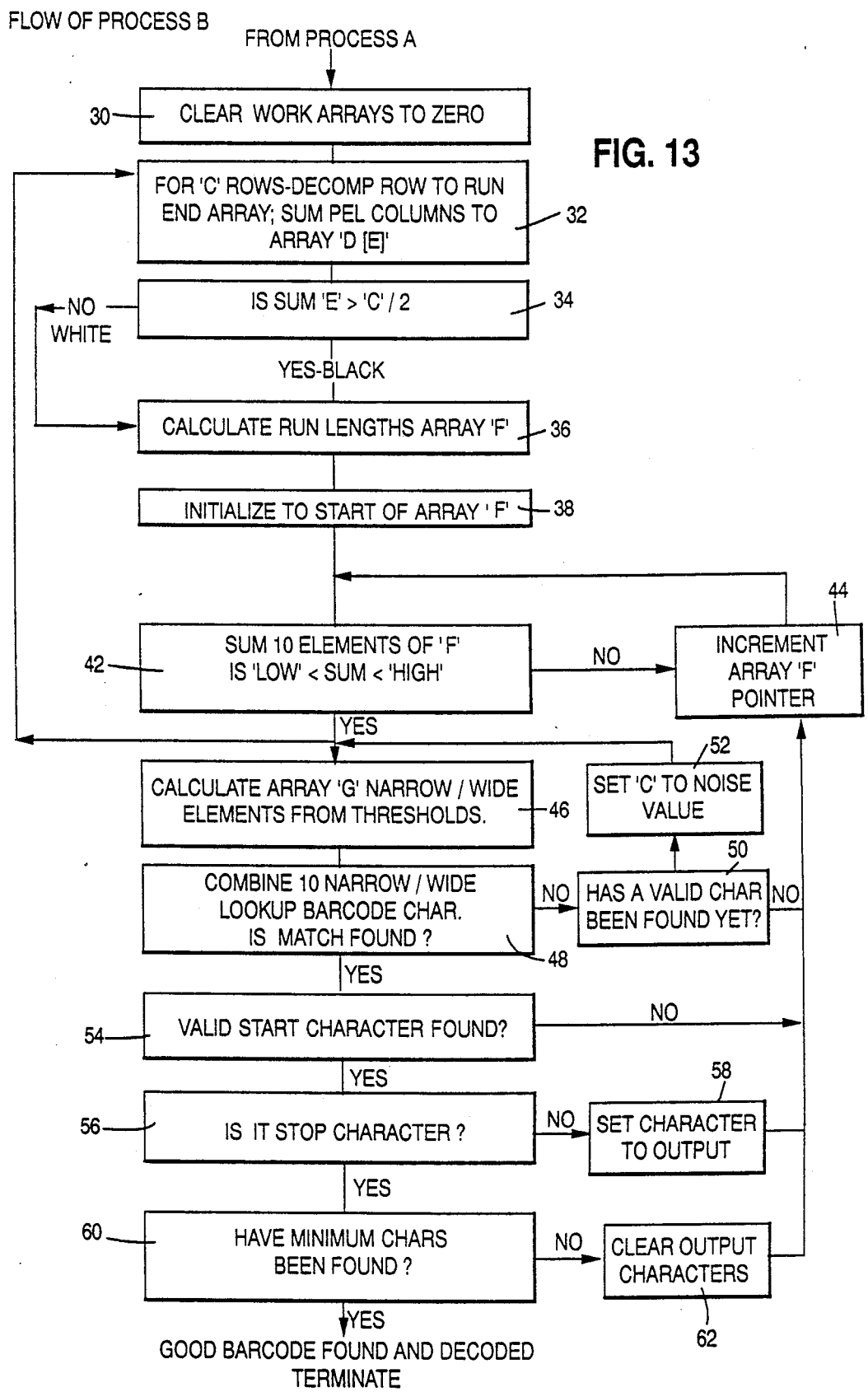

METHOD AND APPARATUS FOR BARCODE RECOGNITION IN A DIGITAL IMAGE

BACKGROUND OF THE INVENTION

1. Technical Field

The invention disclosed broadly relates to data processing systems and more particularly relates to improvements in barcode recognition.

2. Background Art

With digital imaging techniques there is a general requirement to capture coded information that can be associated with the image. This coded information is used to classify the image and to ease later retrieval of the picture from storage.

Modern digital scanning machinery can scan a page of paper in less than one second. If a human operator then has to view the image representation and key enter the relevant code information, the effective capture speed takes, perhaps, 15–20 seconds. This reduces operator productivity and prevents the imaging application from being a cost justified exercise.

The requirement is to be able to scan the bit patterns in the digital image file and to create coded information for classifying the image.

Optical character recognition (OCR) is very sensitive to noise in the image and there is little redundancy in the digital image data representing textual characters to permit (with current art) much higher than a 98% accuracy in recognition—particularly with low resolution digital images such as come from a facsimile machine.

Optical mark reading (OMR) has been used for some time to allow mechanical classification of images with high reliability. This technique has the disadvantage that the whole image is the OMR data and so the coded data can only be used to classify related images in a set containing the OMR page.

Barcodes (of which there are probably 15–20 varieties of coding techniques) are now an everyday occurrence on many objects handled by the general public—particularly groceries, toiletries and stationery items. They are easy to generate and print on current art general purpose printers. They are sufficiently unobtrusive on documents that will be scanned into a digital imaging system that they can be an integral part of the page from which coded data needs to be extracted.

The problem to be solved is to locate the occurrence of a barcode contained in the data representing a digital image and to convert that barcode image into the corresponding coded data. The requirement is to get 100% accuracy in recognition or an indication of failure. There cannot be partial recognition or potential substitution of characters since the data will be used for classification. (Recognition of "HERE" instead of "THERE" is not acceptable.)

The requirement is to be able to recognize barcodes where accidental or malicious damage has occurred (for example, someone has written across the paper where the barcode appears). A significant amount of skew that may occur during the image capture process must also be tolerated.

OBJECTS OF THE INVENTION

It is therefore an object of the invention to locate the occurrence of a barcode contained in data representing a digital image, in an improved manner.

It is another object of the invention to locate the occurrence of a barcode contained in the data representing a digital image and to convert that barcode image into corresponding coded data, in an improved manner.

It is still a further object of the invention to locate the occurrence of a barcode contained in data representing a digital image and to obtain substantially 100% accuracy in recognition.

It is still a further object of the invention to locate the occurrence of a barcode contained in data representing a digital image, where the barcode features are obscured.

It is yet a further object of the invention to locate the occurrence of a barcode contained in data representing a digital image, where there is significant skew of the barcode.

SUMMARY OF THE INVENTION

These and other objects, features and advantages are accomplished by the barcode recognition system and method disclosed herein. A hard copy page which has been digitally scanned at a spatial resolution that permits individual barcode elements to be identifiable, is processed by the invention. The digitally scanned image of the page is represented by a bi-level bit string that represents the black and white markings on the page. This bit string is compressed using a standard compression algorithm. The invention is a combination of a recognition module and a calling environment which provides information on what type of barcode is to be recognized and the strategy to be applied in identifying and decoding the barcode. For N raster lines of a dimension "x," an array of one byte sums of dimension "x" is created. The sums are the sum of the "1" bits in the rectangular binary image input array in the N lines of the image. A threshold value is established to determine the length of each run of either a black or white space. If an element from the sum array is greater than the threshold, then it is assumed to be black. If it is less than a threshold, then it is assumed to be white. Then a new array can be generated which will have a dimension equal to the number of changes from black to white in the original "x-y" digital image. The values in this array will represent the length of each run of same color pels. These runs are then normalized according to rules of a particular barcode standard being handled. For example, if the barcode is a three out of nine code, there are nine elements plus a character separator for each barcoded character. There is also a start character and a stop character which delineates a valid barcode. The normalization process for the three out of nine codes starts with a first black run from the array generated in the previous step and it sums the first 10 values. If any individual element value falls outside the environment defined values, then the runs do not represent the image of a valid barcode. If the sum of these 10 values does not fall within the environment defined thresholds, then once again the run does not represent a valid barcode. If the sum passes these tests, it is then divided by a value related to the total number of spatial elements for the barcode being handled. For example, in a three out of nine barcode, there are 16 spatial elements, seven single width and three triple width elements The dividend then represents the pel width for each spatial element in this occurrence of the barcode. Two threshold values are calculated from this dividend, which are used for the normalization process. The last part of the normalization process is to create a new array of the same diamension as the array of run lengths. Each element in this array is the dividend of the run length and either the black or the white threshold value. The final step in the process involves creating a lookup value in a 16 bit word comprising a representation of M normalized elements, where M is the number of physical elements in each barcode character. The lookup is then matched against a table of valid values for the barcode style. If a valid value is found, the process repeats with the next set of elements. If no valid value is found, the normalization process is restarted at the next black run element in the run array and the process is repeated until a fully valid barcode is found or the image array has been fully processed.

BRIEF DESCRIPTION OF THE DRAWINGS

These and other objects, features and advantages of the invention will be more fully appreciated with reference to the accompanying figures.

FIG. 4 is a table of decoding constraints used to illustrate the invention.

FIG. 5 is an expanded view of pels in an obscure barcode.

FIG. 6 illustrates how FIG. 5 might appear with a skewed orientation.

FIG. 7 depicts a table of numbers which result from partially decompressing a scanned row into run-ends.

FIG. 8 is a table of numbers which result from partially decompressing six rows up to a pel column 40.

FIG. 13 is a flow diagram of a second stage in the recognition of a barcode, continuing from the flow diagram in FIG. 12.

DESCRIPTION OF THE BEST MODE FOR CARRYING OUT THE INVENTION

Figure 1:
FIG. 1 illustrates a perfect barcode, with the barcode elements being perpendicular to the line of the paper.

FIG. 1 shows an example of a three out of nine barcode. The data encoded are the three letters "IBM." The asterisk ("*") mark is used as a start/stop character. The four vertical lines are respectively separating the "*" from the "I," the "I" from the "B," the "B" from the "M," and the "M" from the "*," designates the position of the intercharacter spaces. The small black square above and to the left of the barcode in FIG. 1 represents other information in the page image. FIG. 1 is an example of a good clear image. All the black bars are complete and the white spaces have no black noise introduced. FIG. 1 represents the content of an image page which contains a barcode.

Figure 2:
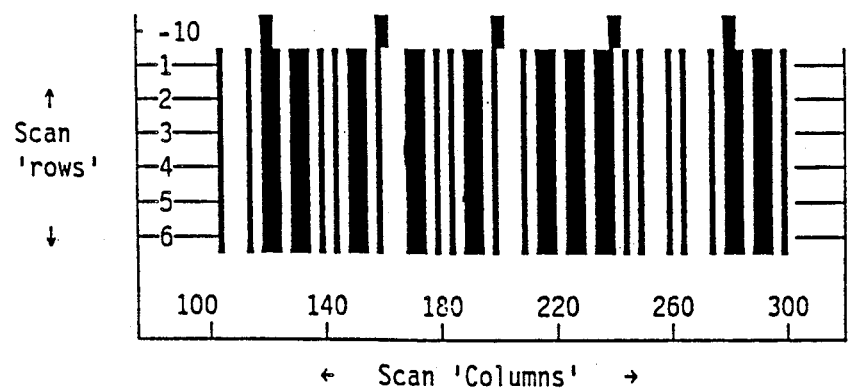
FIG. 2 illustrates how the barcode in FIG. 1 might be represented in a digital image.

FIG. 2 shows how, after the scanning operation, the digital image is represented by "rows" and "columns" of pels. Six contiguous barcode "rows" are shown, labeled 1-6 plus row −10, which shows image data at an earlier point in the image. Two hundred "columns" are taken from column 100 to column 300.

Figure 3:
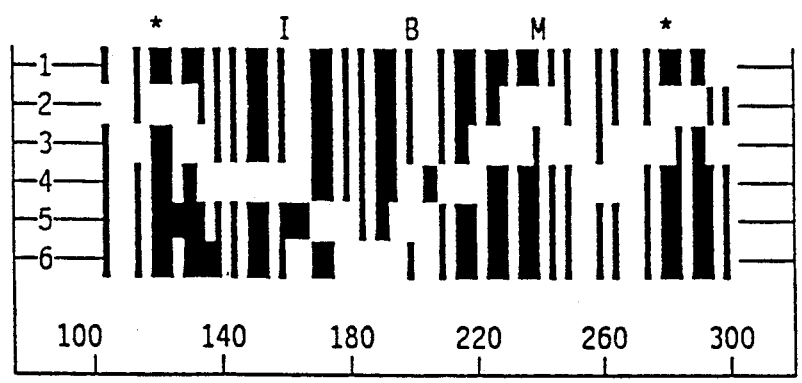
FIG. 3 illustrates how digital image data of the barcode may be corrupted in practice.

FIG. 3 shows an example of how the digitized image of FIG. 2 may be "damaged." In the vertical black bars, some of the "black" area is missing and in the white spaces, black noise is present. FIG. 5 shows an expanded view of rows 1-6 and columns 100-141 in FIG. 3. FIG. 6 illustrates how the image of FIG. 5 might appear if "skewed." From column 121, the pels are one row up, corresponding to a five percent skew. From row 4, the pels are one column to the right, corresponding to a 33 percent skew.

This invention sets out to solve the above problem using software running in an IBM system. The initial implementation runs on an Intel x86 processor. The technique is applicable to any programmable machine which can handle bit strings, (for example 68000, PC/RT, System/370, AS/400).

In the initial image pickup, a page has been digitally scanned at a spatial resolution that permits the individual barcode elements (black/white transitions) to be identifiable. This typically implies a horizontal resolution for horizontal oriented barcodes) of at least 200 pels per inch. The process described works against the bi-level bit string that represents the image page. This bit string is compressed using either the IBM MMR compression algorithm or the CCITT G4 MMR method. A description of a suitable bit string compression technique can be found in U.S. Pat. No. 4,646,356 to Anderson, et al. entitled "Method for Converting a Bit Map of an Image to a Run Length or Run End Representation," assigned to the IBM Corporation and incorporated herein by reference.

The invention is a combination of a kernel computer program method for barcode recognition and a calling environment which provides information on what type of barcode is to be recognized and the strategy parameters to be used. It also provides the kernel with buffers for the compressed image.

A description of the kernel computer program method and calling environment follows.

The Barcode Recognition Kernel

Input

A pointer to a buffer which contains compressed bi-level image data of dimension "x" pels by "y" pels. The example for this description is shown in FIG. 5 as a fragment of the barcode shown in FIG. 3.

* A series of strategy values, such as shown in the table of FIG. 4.

Output

* A character value
* A return code indicating success or failure

Process

1. Partially decompress a raster line of the compressed image to run-ends (FIG. 7 shows a typical result)
2. Determine if the line may contain a valid barcode. FIG. 4 shows the values to be used in this example.
   a. There must be at least a defined number of run-ends for this line. With the worked example, for a minimum of four characters in the barcode each with 10 elements, there must be at least 4*10 (40) run-ends in the area under consideration.
   b. The pels encompassed by the above number of run-ends must fall within a range. With the worked example, there must be a minimum of 1*16*4=64 pels encompassed by 4*10 run-ends and a maximum of 6*16*4=384 pels.

It can be seen that run-end #40 in FIG. 7 meets these requirements so the line is considered for further processing. If this test did not succeed then a return is made to step 1.

The example of FIG. 5 shows just the barcode isolated from the rest of the image page. In practice the barcode will not be at the start of the raster line in the decompressed table, then the line is searched with test 2 above. This is a very fast check since the table is comprised of pairs of two byte words (white run-end, black run-end) and the difference between the nth and the n+ (40*2)th is the value which must be compared to the thresholds. It is known that the start of a barcode is represented by a white run-end (start of black). At this point a row with a potentially valid barcode is present.

Figure 9:
FIG. 9 illustrates how an array of sums of six rows may be built from the table in FIG. 8.

3. For "n" raster lines of dimension "x" create an array of one byte sums of dimension "x." The sums are the sum of the "1" bits in the rectangular binary image input array in "n" lines of the image. (FIG. 8 shows the fragment run-ends for six lines which are summed as shown in FIG. 9.)

Figure 10:
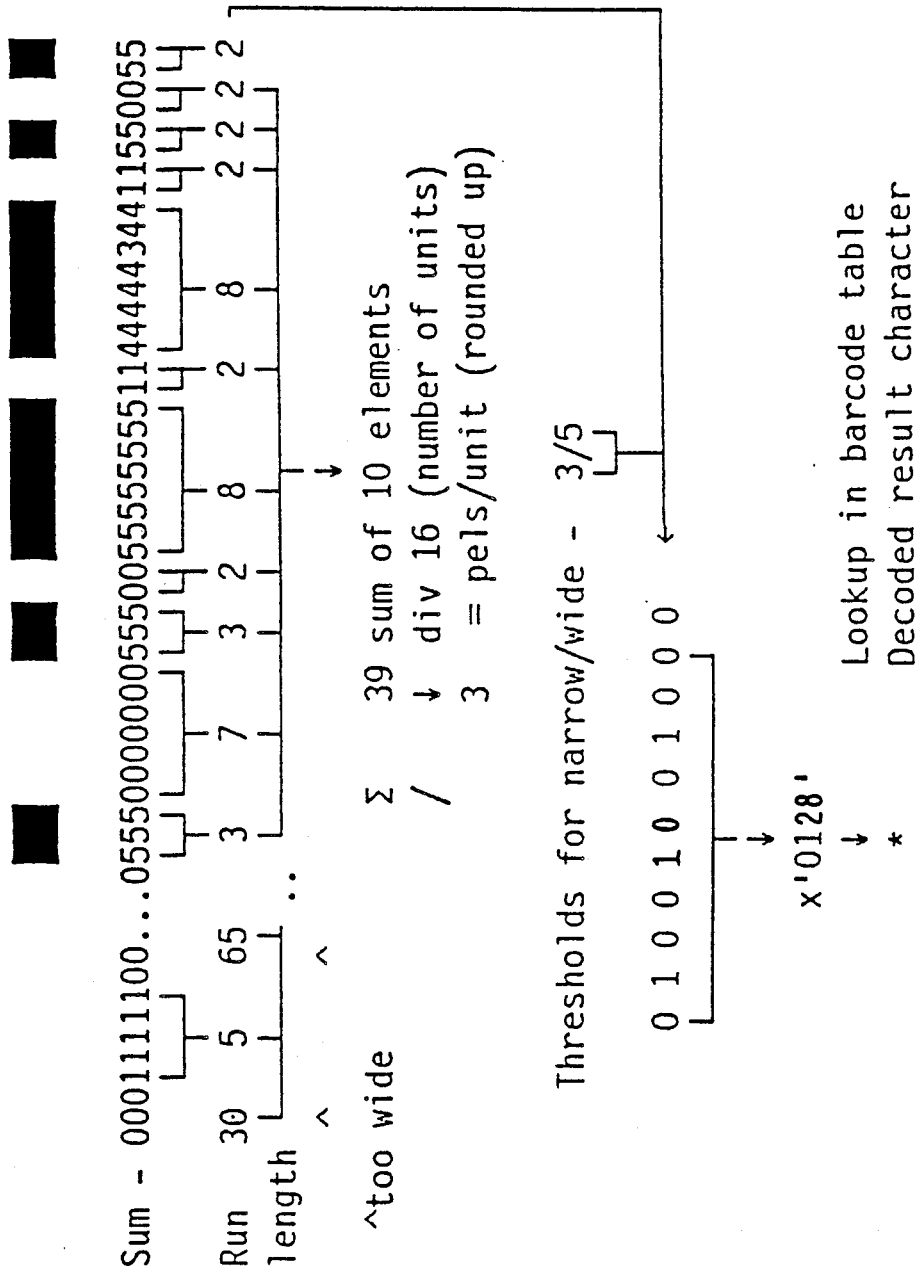
FIG. 10 shows how a new array is generated.

4. Using a threshold value derived from the number of lines summed, determine the length of each run of either black or white. If an element from the sum array is greater or equal to the threshold then it is assumed to be black. If less than the threshold it is assumed to be white. A new array is now generated (FIG. 10). This will have a dimension equal to the number of changes from black to white in the original "x" (40) wide digital image. The values in this array will represent the length of each run of same color pels. FIG. 10 shows this.

These runs are next normalized according to rules specific to a particular barcode standard being handled. For the three out of nine code, there are nine elements plus character separator for each barcoded character. There is also a start character and a stop character which delineate a valid barcode. The normalization process for the three out of nine code starts with the first black run from the array generated in the previous step and sums the first 10 values. If any individual element value falls outside environment defined value (24) then the runs do not represent the image of a valid barcode. If the sum of these 10 does not fall within environment defined thresholds (1*16, 6*16) again the runs do not represented a valid barcode. A sum which passes these tests is then divided by a value related to the total number of spatial elements (not actual elements) for the barcode being handled. (For the three out of nine there are 16 spatial elements— seven single width and three triple width.) The dividend represents the pel width of each spatial element in this occurrence of the barcode. In the example the result of this calculation is 3 (2.5 rounded up).

6. Two threshold values are calculated from this dividend which are used for the normalization process. The threshold calculation depends on the characteristics of the barcode style being recognized. In the example the two thresholds are calculated as 3 and 5.

Figure 11:
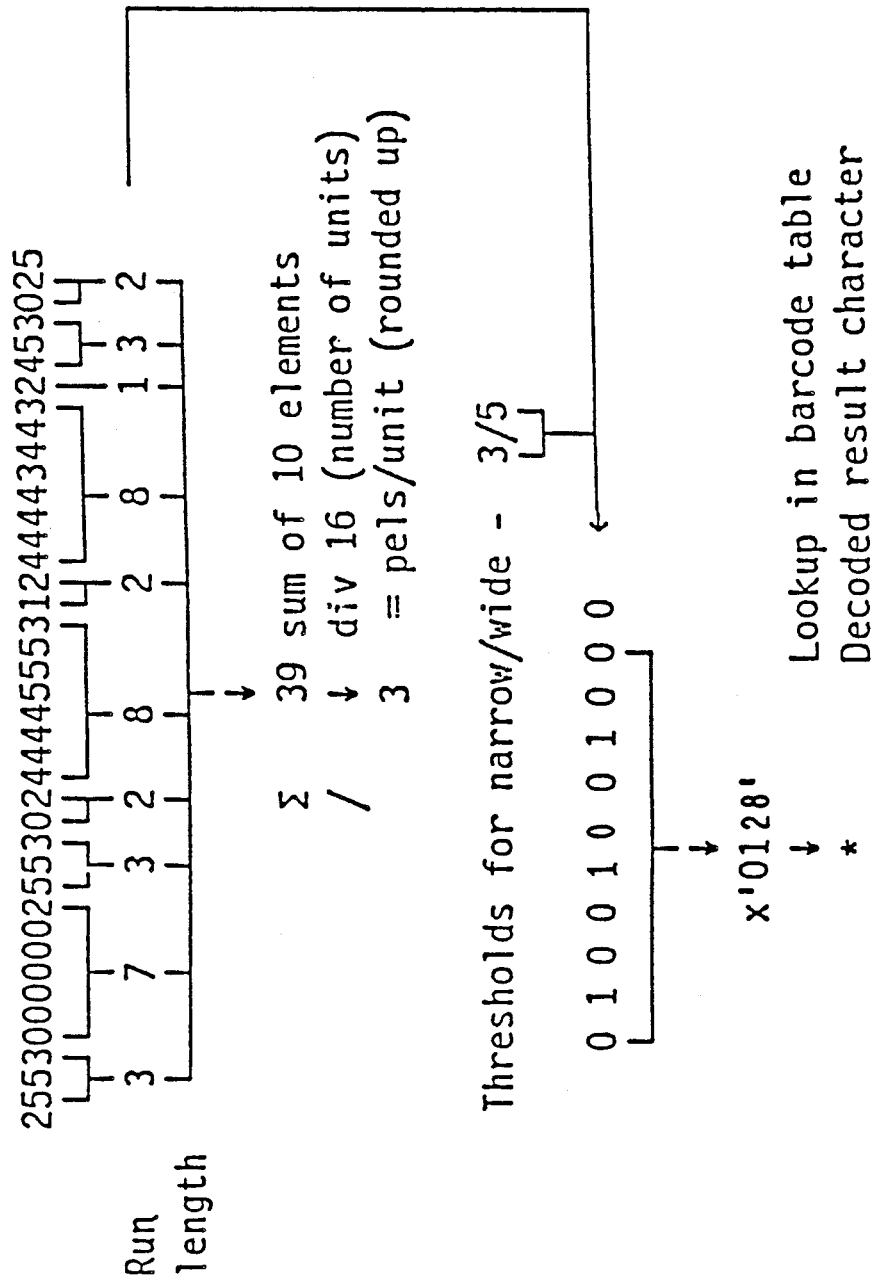
FIG. 11 illustrates the sum array from the skewed image in FIG. 6.
Figure 12:
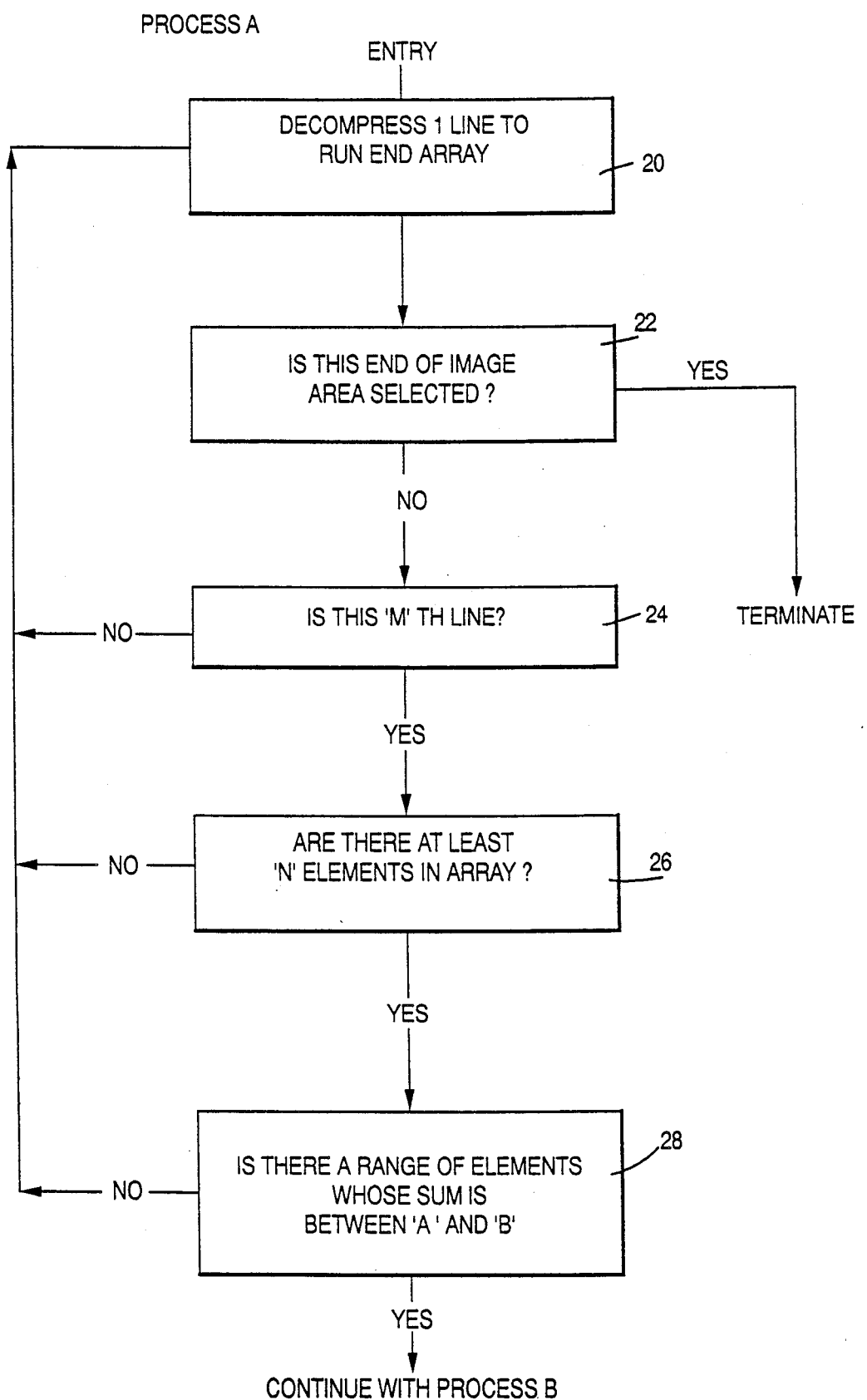
FIG. 12 is a flow diagram of the barcode recognition method, for the initial evaluation of the raster line.

7. The last part of the normalization process is to create a new array of the same dimension as the array of run lengths. Each element in this array is calculated as either 0 or 1 for narrow or wide. The black or the white threshold values are used to determine which the run length represents. If it is a white run and is three or more then it is regarded as a wide white; if less, then it is regarded as narrow white. If it is a black run and is five or more it is regarded as a wide black; if less, as a narrow black. FIG. 10 shows the result for the fragment shown in FIG. 5. FIG. 11 shows the same result for the badly skewed fragment shown in FIG. 6. The difference in thresholds for black: and white provides the tolerance to skew and printing blur.

8. The final process involves creating a lookup value in a 16 bit word comprising a representation of "m" normalized elements where "m" is the number of physical elements in each barcode character (10). This is in fact nine elements plus intercharacter gap which is narrow. The lookup value is then matched against a table of valid values for the barcode style. In the example a hexadecimal value of 0128 is generated which corresponds to the character "*" in the three out of nine barcode table. If a valid value is found, the process repeats with the next set of elements. If no valid value is found, the normalization process is restarted at the next black run element in the runs array and the process repeated until a fully valid barcode is found or the image array has been fully processed.

If a valid start character is found but then an error is detected on finding further characters in the code, the routine will sum an additional set of rows to those already summed. (In the example a value of 10 rows is used.) This often allows noise to be eliminated. By doing it in two steps, the good quality images can be recognized very quickly and it is only the poor quality ones which need additional processing performed.

DESCRIPTION OF FIG. 12-PROCESS A

Step 20 obtains one raster line from the compressed image into a run-end array as illustrated in FIG. 7. The decompression routine will return a status code if the end of the image page has been processed.

Step 22 checks this indicator and causes the routine to terminate with a "nothing found" indicator if end of image wan detected.

Step 24 checks the number of the row (line) just decompressed. If it is the "m"th line where m=lines to skip * integer, then proceed to 26, else ignore this line and decompress (20) next line.

Step 26 checks the first storage word of the run-end buffer which contains a numeric value related to the number of run-ends detected in this image row. If the number is less than a threshold calculated as being min coded characters * elements per character, then discard this line, as there cannot be valid barcode represented in the image data, and decompress (20) next line. If the number is greater than the threshold, then proceed with 28. In the example, row −10 has only 10 run-ends, so does not meet the minimum requirement of having 4*10 run-ends to represent four coded characters.

Step 28 now checks that the difference between two run-ends, separated by the threshold number of run-ends, starting with a white run-end (start of black), is between the minimum and maximum thresholds for a valid barcode. In the example, if the difference between run-end 1 and run-end 40 is between 64 and 384, it meets the test. If it does not meet the test, then it is repeated for run-ends 3 and 42 and so on, until the run-end array is exhausted. If the test fails across the whole row, then decompress (20) next line. If the line meets the test, then the line is passed to process B at step 30.

DESCRIPTION OF FIG. 13-PROCESS B

Step 30 clears the work arrays to zero

Step 32, the row passed from Process A is summed to a new array d. The array d has a dimension equivalent to the number of pels e in an image row.

The sum process involves adding 1 to each of the array elements corresponding to black pixels in the image row, e.g if the 101st pixel is black, then the 101st element will be incremented by one. The summing Process is performed on a further c-1 rows, which have to be partially decompressed to run-ends, to complete the summing of c rows. This results in an array d whose elements e will have values between 0 (pure white) and c (pure black).

Steps 34 and 36 process this array d to create a new array f. The new array f is calculated where each element is the run length of black or white runs found in the array d. The sum run length is the number of contiguous elements which are less than or equal to c/2 (white) or greater than c/2 (black). Array f contains a representation if the normalized image after noise and dropout have been considered.

Step 42 sums the first 10 (number of elements in barcode character) of array f. It checks if sum is between thresholds. If between thresholds, then it continues with 46, else it continues with 44.

Step 44 increments the pointed into array f to point to next black run length as the "first" for 42. Continue with 42, if not at end of array. If at the end of array, then terminate by returning to Process A.

Step 46, new array g calculated from array f. Elements in g correspond one for one with array f. The relationship is calculated by taking the sum from 42, divided by the number of spatial elements in the barcode character. Depending on the type of barcode being recognized, thresholds are calculated for white/black wide/narrow elements corresponding to the run lengths in array f. The elements in array g then contain the wide/narrow indicators.

Step 48 combines 10 (depending on barcode type) wide/narrow indicators to a 10 bit value which is used to look up a character code in a table dependent on barcode type If no valid code found, 50 is executed. If a valid code is found, then 52 is executed.

Step 50 checks if a valid code has already been found. If so, then the image being processed may be damaged and further processing (summation of additional rows) may help identify a good barcode. If the additional summation has not already been done, c is set to the next sums value provided as a calling option and more rows are processed in 32 and the steps 32-48 repeated. If additional processing is already done, then try further across the image row by doing 44.

Step 54 is entered if a valid barcode character is found. If the image has been skewed down at the left end, a valid character may be found before a start character is decoded. This checks if a start code has been found. If not, the character is not valid in context, so 44 is executed.

Step 56 is entered if current character is valid and a start character has been decoded. If the code is not a stop character, it is considered as a valid code and control moves to 58. If it is a stop character control moves to 60.

In step 58, a valid character has been found so it is set to the output buffer and the decoding process is continued with 44.

Step 60 is entered if start and stop characters, plus some number of data characters have been decoded. A check is made to see if the minimum number specified have been found. If so, then a good barcode has been found and a successful return can be made to the caller. If not, then proceed with 62.

Step 62 clears the output buffer, as barcode did not meet minimum requirements and continues with step 44.

The Calling Environment

This part of the recognition process locates a digital image file and prepares a buffer of compressed bi-level image data for passing to the kernel routine.

Some applications will know where in the total image page the barcode is likely to be found, so information on the coordinates of that rectangle can be passed to the kernel. This allows the kernel search for potential barcodes to be limited to a range of decompressed rows (need not start looking until the start row is reached and can stop as soon as the maximum vertical extent is reached). Other applications will know only that a barcode appears somewhere within the image. This environment controls the strategy for barcode search. The strategy will depend on, amongst other items.

* Height of barcode
* Anticipated maximum level of skew of barcode
* Scanner contrast settings for differentiating between black and white—this will determine the threshold settings to pass to the kernel
* Probable location of barcode for order in which search is done
* The probability that the barcode may have been corrupted by, for example, a handwritten annotation on the paper page that was scanned The key parameters that are passed to the kernel are:
* Pointer to compressed image data to be processed
* Threshold values By separating the two functions it is possible to optimize the processing speed of the routines for the assumption that a clear image of a barcode is to be processed and, on indication of a failure, the same image rectangle can be processed more thoroughly to discriminate noise, skew and other extraneous information which occurs in the real word of image processing.

The advantages of the invention lie in the applicability of the method to decoding good raster images at a high speed while also being able to adapt itself to handle poor quality, ambiguous images for a slightly longer processing time. Discrimination parameters can be set according to the application and what type of barcode and document image the application is directed to. The invention is independent of the image scanning resolution, in pels per linear measure, and is independent of barcode geometry that is the absolute width of the bars.

Although a specific embodiment of the invention has been disclosed, it will be understood by those having skill in the art that changes can be made to that specific embodiment without departing from the spirit and the scope of the invention.

What is claimed is:

1. A computer implemented method for recognizing a barcode contained in data representing a digital image, comprising the steps of:
   buffering digital image data for N raster lines of a length of x pels, where N is an integer greater than 2 and x is an integer greater than 2;
   forming an array of x sums from said N raster lines of buffered data;
   comparing each sum with a threshold value and attributing it as representing a black area if greater than said threshold value or attributing it as representing a white area if less than said threshold value;

forming a second array of data representing said black and white regions;

normalizing said sequence of black and white regions to a barcode standard;

dividing said normalized regions by a value related to the total number of spatial elements for the barcode standard;

characterizing each spatial area as a long or short run;

decoding each barcode character and generating an alphanumeric string represented by said barcode.

2. A computer implemented method for recognizing a barcode contained in data representing a digital image, comprising the steps of:

inputting data representing a plurality of M raster lines of a digital image;

determining whether one raster line of said plurality contains a barcode;

converting said one raster line into a run-end array;

determining if there are N elements in said run-end array of said one raster line; converting said plurality of M raster lines into a plurality of M run-end arrays, representing a plurality of pel columns of said digital image;

summing individual pel columns of said plurality of pel columns for said M raster lines;

attributing one pel column of said plurality of pel columns as black, if a sum of said one pel column is greater than an arithmetic function of M;

calculating run lengths for pel columns of said plurality of pel columns attributed as black;

grouping a plurality of P elements from said calculated run lengths;

identifying a barcode character from said P elements

3. The method of claim 2, wherein said step of determining whether one raster line of said plurality contains a barcode, comprises determining whether at least a predetermined number of run-ends occur in said one raster line.

4. The method of claim 2, wherein said step of inputting data further comprises, selecting the value of the number M raster lines, based upon the expected height of the barcode.

5. The method of claim 2, wherein said step of inputting data further comprises, selecting the value of the number M of raster lines, based upon the anticipated maximum level of skew of the barcode.

6. The method of claim 2, wherein said step of attributing one pel column as black, further comprises selecting said arithmetic function of M to be based on scanner contrast values for differentiating between black and white.

7. An computer implemented apparatus for recognizing a barcode contained in data representing a digital image, comprising: a buffer for buffering digital image data for N raster lines of a length x, where N is an integer greater than 1 and x is an integer greater than 2;

means for forming an array of x sums from said N raster lines of buffered data;

a comparator for comparing each sum with a threshold value and attributing it as representing a black area if greater than said threshold value or attributing it as representing a white area if less than said threshold value;

means for forming a second array of data representing said black and white regions;

means for normalizing said sequence of black and white regions to a barcode standard;

dividing means for dividing said normalized regions by a value related to the total number of spatial elements for the barcode standard;

means for characterizing each spatial area as a long or short run;

decoder for decoding each barcode character and generating an alphanumeric string represented by said barcode.

* * * * *